United States Patent
Albuja et al.

(10) Patent No.: US 10,820,611 B2
(45) Date of Patent: Nov. 3, 2020

(54) MULTI-TEXTURED ANIMAL TREATS

(71) Applicant: NESTEC S.A., Vevey (CH)

(72) Inventors: Mario Guillermo Albuja, Eureka, MO (US); Michael Edward Leiweke, Hillsboro, MO (US)

(73) Assignee: SOCIÉTÉ DES PRODUITS NESTLÉ S.A., Vevey (CH)

( * ) Notice: Subject to any disclaimer, the term of this patent is extended or adjusted under 35 U.S.C. 154(b) by 236 days.

(21) Appl. No.: 16/059,669

(22) Filed: Aug. 9, 2018

(65) Prior Publication Data

US 2018/0343893 A1 Dec. 6, 2018

Related U.S. Application Data

(62) Division of application No. 13/876,044, filed as application No. PCT/US2011/001684 on Sep. 29, 2011, now Pat. No. 10,085,463.

(60) Provisional application No. 61/571,309, filed on Jun. 24, 2011, provisional application No. 61/404,277, filed on Sep. 30, 2010.

(51) Int. Cl.
| | |
|---|---|
| *A23K 40/25* | (2016.01) |
| *A01K 15/02* | (2006.01) |
| *A23K 10/30* | (2016.01) |
| *A23K 50/40* | (2016.01) |
| *A23K 40/00* | (2016.01) |
| *A23K 40/20* | (2016.01) |
| *A23K 20/147* | (2016.01) |

(Continued)

(52) U.S. Cl.
CPC ............ *A23K 10/30* (2016.05); *A23K 20/147* (2016.05); *A23K 20/163* (2016.05); *A23K 40/00* (2016.05); *A23K 40/20* (2016.05); *A23K 40/25* (2016.05); *A23K 50/40* (2016.05); *A23K 50/42* (2016.05); *A01K 15/025* (2013.01)

(58) Field of Classification Search
CPC .... A01K 15/025; A01K 15/026; A23K 40/25; A23K 50/42
USPC .......................................... 119/710
See application file for complete search history.

(56) References Cited

U.S. PATENT DOCUMENTS

| | | |
|---|---|---|
| 4,006,266 A | 2/1977 | Bone |
| 4,055,681 A | 10/1977 | Balaz et al. |

(Continued)

FOREIGN PATENT DOCUMENTS

| | | |
|---|---|---|
| CN | 1838879 | 9/2006 |
| JP | 2005538715 | 12/2005 |

(Continued)

OTHER PUBLICATIONS

International Search Report and Written Opinion dated Feb. 22, 2012.

*Primary Examiner* — Walter A Moore
(74) *Attorney, Agent, or Firm* — K&L Gates LLP

(57) ABSTRACT

This disclosure provides multi-textured animal treats and methods for making the multi-textured animal treats. In a general aspect, the multi-textured animal treats include a hard component and one or more soft components. The hard component can have a mechanical joint and the one or more soft components can be fixedly attached to the mechanical joint and wrapped around the hard component. The multi-textured treats can include an adhesive or a combination of adhesives and mechanical joints for providing an additional attachment mechanism.

20 Claims, 2 Drawing Sheets

(51) Int. Cl.
*A23K 20/163* (2016.01)
*A23K 50/42* (2016.01)

(56) References Cited

U.S. PATENT DOCUMENTS

| | | | |
|---|---|---|---|
| 4,260,635 | A | 4/1981 | Fisher |
| 4,284,652 | A | 8/1981 | Christensen |
| 4,330,566 | A | 5/1982 | Meyer et al. |
| 4,900,572 | A | 2/1990 | Repholz |
| 5,456,934 | A | 10/1995 | Lee |
| 5,595,142 | A | 1/1997 | Chill |
| 6,312,746 | B2 | 11/2001 | Paluch |
| D494,735 | S | 8/2004 | Dahl et al. |
| 6,896,924 | B2 | 5/2005 | Hernandez |
| D522,712 | S | 6/2006 | Nakata |
| D522,713 | S | 6/2006 | Nakata |
| D534,706 | S | 1/2007 | Cuadrado |
| D586,534 | S | 2/2009 | Oelsner et al. |
| 7,485,330 | B2 | 2/2009 | Anderson et al. |
| D591,479 | S | 5/2009 | Schalk et al. |
| D627,536 | S | 11/2010 | Albuja et al. |
| 9,719,338 | B2 | 7/2017 | Mahe |
| 2002/0086096 | A1 | 7/2002 | Fux et al. |
| 2003/0228400 | A1 | 12/2003 | Dahl et al. |
| 2004/0052906 | A1 | 3/2004 | Hernandez |
| 2005/0181097 | A1 | 8/2005 | Townsend et al. |
| 2006/0141001 | A1 | 11/2006 | Finkelmeier et al. |
| 2006/0292288 | A1 | 12/2006 | Maynard |
| 2007/0212456 | A1 | 9/2007 | Axelrod |
| 2009/0004328 | A1 | 1/2009 | Weinberg |
| 2009/0110778 | A1 | 4/2009 | Muscroft |
| 2010/0083910 | A1 | 4/2010 | Axelrod et al. |
| 2010/0224138 | A1 | 8/2010 | Axelrod |
| 2010/0260905 | A1* | 10/2010 | Axelrod ............... A23K 20/174 426/311 |

FOREIGN PATENT DOCUMENTS

| | | |
|---|---|---|
| WO | 03092404 | 11/2003 |
| WO | 2009157950 | 12/2009 |

* cited by examiner

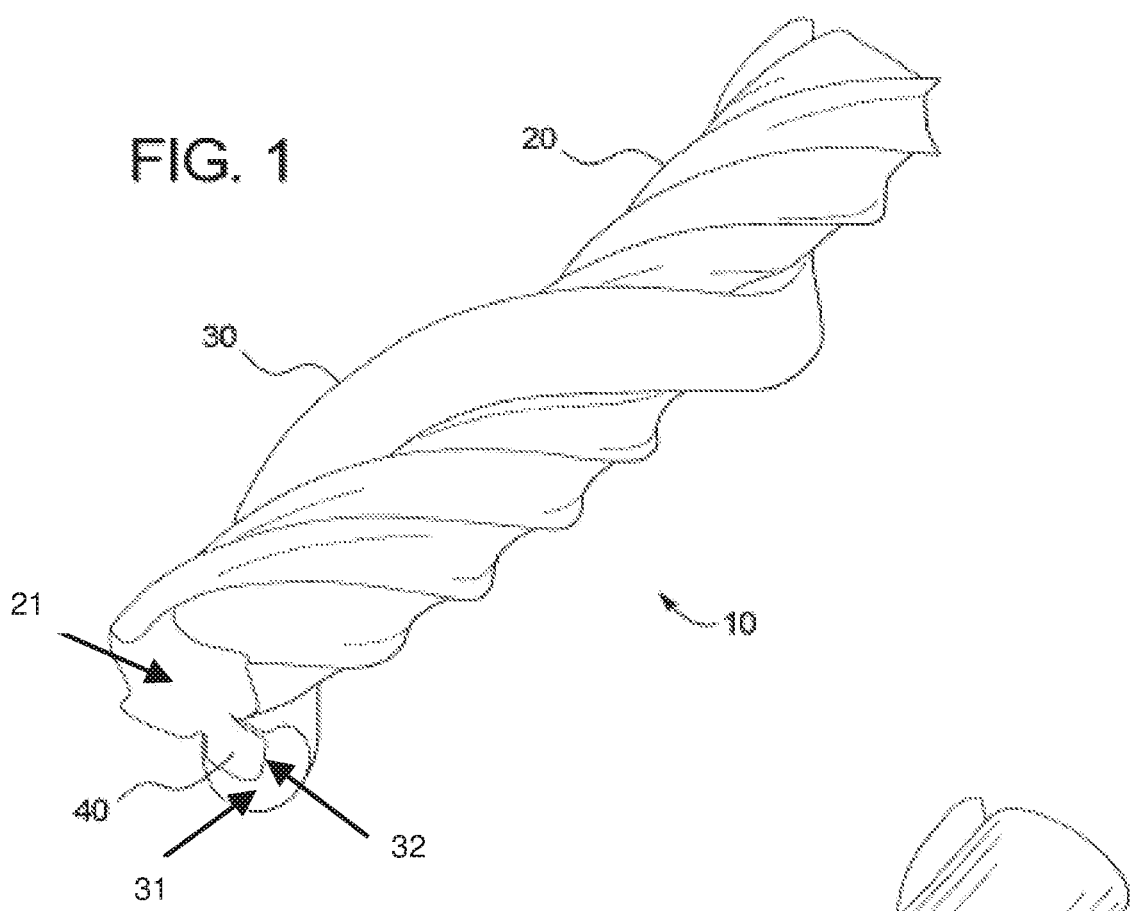
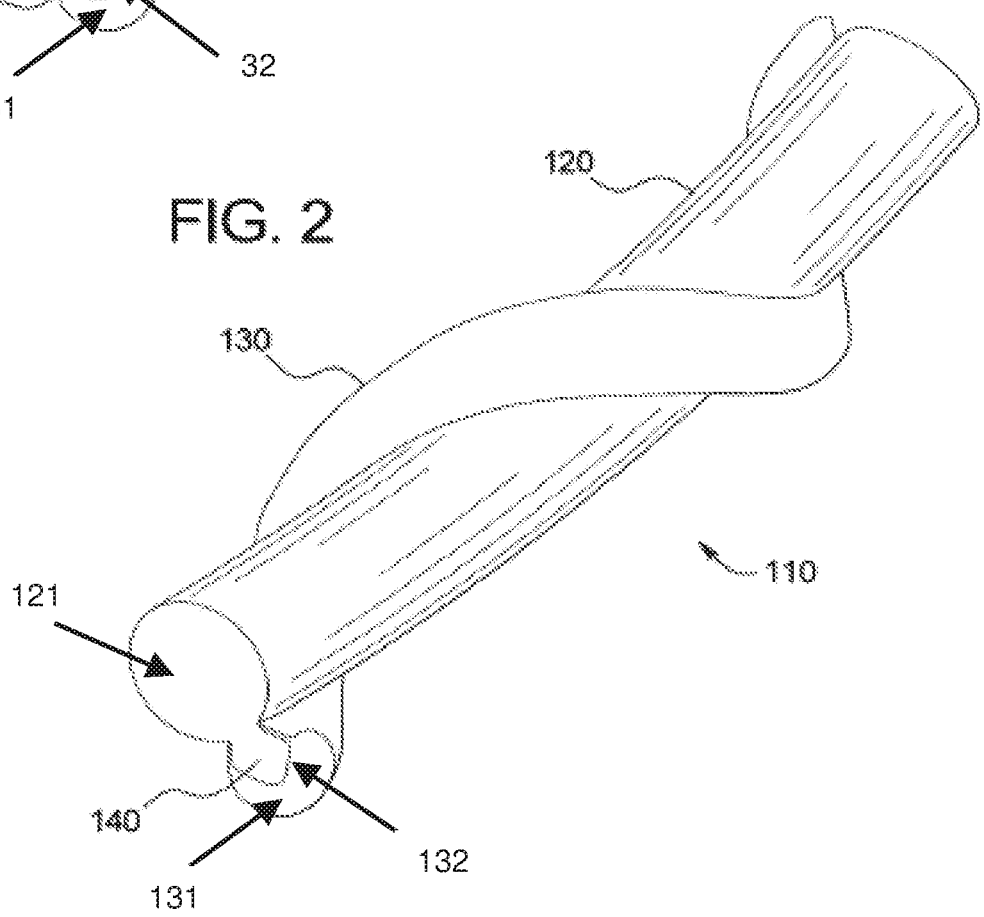

MULTI-TEXTURED ANIMAL TREATS

CROSS REFERENCE TO RELATED APPLICATIONS

This application is a divisional of U.S. application Ser. No. 13/876,044 filed Jun. 13, 2013, which is a National Stage of International Application No. PCT/US2011/001684 filed Sep. 29, 2011, which claims priority to Provisional Application Ser. Nos. 61/571,309 filed Jun. 24, 2011 and 61/404,277 filed Sep. 30, 2010, the entire contents of which are incorporated herein by reference.

BACKGROUND

Field of Technology

The invention relates generally to multi-textured animal treats and particularly to multi textured animal treats having different textural components that stay together for an extended period.

Description of Related Art

There are many pet food products on the market. The pet food products can be in a variety of shapes and structures such as kibbles, biscuits, rawhide products and meat emulsion products. Typically, these pet food products are homogenous in that they are usually made from the same materials throughout the product. Even pet food products that appear to be made from different base materials are usually made by providing the same base materials with different colors so as to give the pet food products a multi-component appearance.

The pet food products can be in a soft, hard or chewy form to achieve a variety of different objectives. Hard or chewy pet food products can be used to provide healthy and strong teeth in pets as they are chewed. However, the textures of many hard and chewy pet food products are often unappealing and unpalatable. For example, extruded dry pet foods are typically provided in hard lumps and have a dry, dusty appearance. Soft pet food products may be used to supply a specific nutritional component in a more readily palatable form, but do not promote strong teeth in the pets to the same extent that hard pet food products do. Providing a single pet food piece having a soft and hard component can overcome these problems.

Although hard pet food components and soft pet food components may be sold together as separate pieces (e.g., kibbles and bits), there are no satisfactory multi-textured pet food products formed entirely in one piece currently on the market. This arises because the hard pet food component and the soft pet food component are usually made from different materials that will not remain attached to each other for long periods of time without the two components becoming unstable and separating from each other. When this happens, it defeats the purpose of making a single multi-textured pet food product in the first place.

SUMMARY

It is, therefore, an object of the invention to provide multi-textured animal treats having a hard component and at least one soft component that does not separate from the hard component for an extended period, e.g., at least 12 months.

It is another object of the invention to provide multi-textured animal treats having a hard component that provides resistance to an animal's teeth to provide a brushing effect on the surface of the teeth.

It a further object of the invention to provide multi-textured animal treats that provides a delivery vehicle for functional ingredients needed for a healthy pet or other animal.

It is another object of the invention to provide methods of making multi-textured animal treats having a hard component and at least one soft component.

These and other objects are achieved using multi-textured animal treats having a hard component and at least one soft component. The soft component(s) are attached to the hard component mechanically via the use of a corresponding mechanical joint on the hard component. In addition to or in place of the mechanical joint(s), the soft component(s) can be attached to the hard component using an edible adhesive.

Additional and further objects, features, and advantages of the invention will be readily apparent to those skilled in the art.

BRIEF DESCRIPTION OF THE DRAWINGS

FIG. 1 shows a front perspective view of a multi-textured animal treat in an embodiment of the invention.

FIG. 2 shows a front perspective view of a multi-textured animal treat in a second embodiment of the invention.

DETAILED DESCRIPTION

Figure 3:
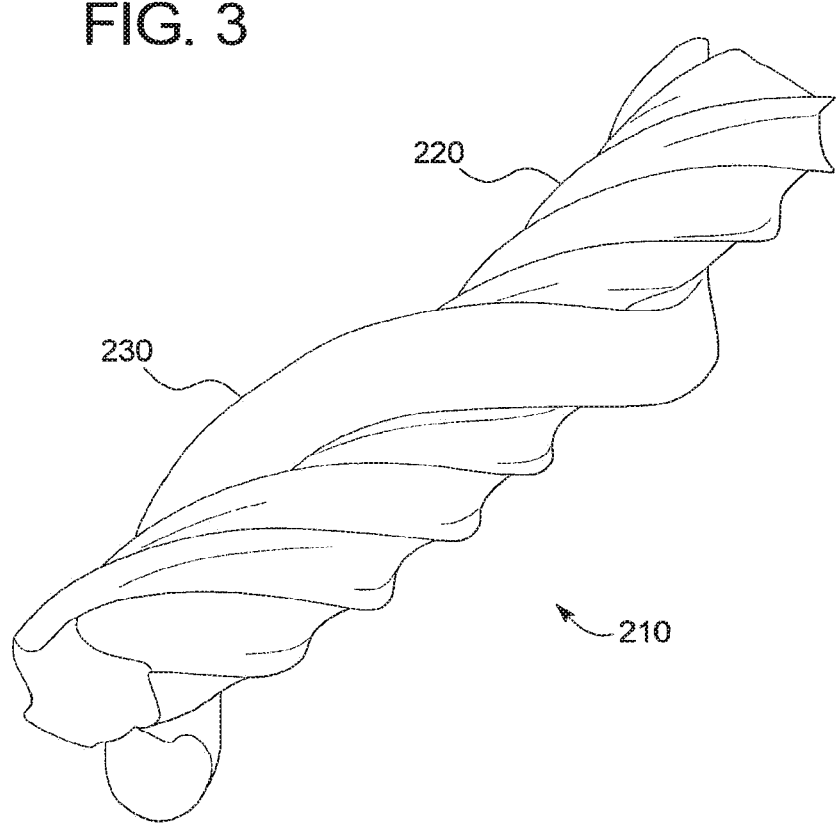
FIG. 3 shows a front perspective view of a multi-textured animal treat in a third embodiment of the invention.

The term "single package" means that the components of a kit are physically associated in or with one or more containers and considered a unit for manufacture, distribution, sale, or use. Containers include, but are not limited to, bags, boxes, cartons, bottles, packages of any type or design or material, over-wrap, shrink-wrap, affixed components (e.g., stapled, adhered, or the like), or combinations thereof. A single package may be containers of individual multi-textured animal treats and other components physically associated such that they are considered a unit for manufacture, distribution, sale, or use.

The term "virtual package" means that the components of a kit are associated by directions on one or more physical or virtual kit components instructing the user how to obtain the other components, e.g., a bag or other container containing one component and directions instructing the user to go to a website, contact a recorded message or a fax-back service, view a visual message, or contact a caregiver or instructor to obtain instructions on how to use the kit or safety or technical information about one or more components of a kit.

All percentages expressed herein relating to the components of a composition are by weight of the total weight of the composition unless expressed otherwise.

As used throughout, ranges are used herein in shorthand, so as to avoid having to set out at length and describe each and every value within the range. Any appropriate value within the range can be selected, where appropriate, as the upper value, lower value, or the terminus of the range.

As used herein and in the appended claims, the singular form of a word includes the plural, and vice versa, unless the context clearly dictates otherwise. Thus, the references "a", "an", and "the" are generally inclusive of the plurals of the respective terms. For example, reference to "a multi-textured animal treat" or "a method" includes a plurality of such "multi-textured animal treats" or "methods". Similarly, the words "comprise", "comprises", and "comprising" are to be interpreted inclusively rather than exclusively. Likewise, the terms "include", "including" and "or" should all be construed to be inclusive, unless such a construction is clearly prohibited from the context. Where used herein the term "examples," particularly when followed by a listing of terms is merely exemplary and illustrative, and should not be deemed to be exclusive or comprehensive.

The products, methods, compositions, and other advances disclosed here are not limited to particular methodology, protocols, and ingredients described herein because, as the skilled artisan will appreciate, they may vary. Further, the terminology used herein is for the purpose of describing particular embodiments only, and is not intended to, and does not, limit the scope of that which is disclosed or claimed.

In one aspect illustrated in FIG. 1, the invention provides a multi-textured animal treat 10 having a hard component 20 including a corresponding mechanical joint 40 and a soft component 30 fixedly attached to mechanical joint 40. Hard component 20 has a hardness as measured by Instron compressibility values ranging from about 25 lb-f to about 60 lb-f (e.g., Instron 5500R) and more preferably from about 25 lb-f to about 55 lb-f or any value within the range. Soft component 30 has a hardness as measured by Instron compressibility values ranging from about 1 lb-f to about 20 lb-f (e.g., Instron 5500R) and more preferably from about 1 lb-f to about 15 lb-f or any value within the range. Multi-textured animal treat 10 can have any suitable length or thickness. As illustrated in FIG. 1, hard component 20 and soft component 30 can take the form of separate ropes or strands 21, 31 that interact with each other.

As further illustrated in FIG. 1, hard component 20 has a twisted shape. For example, the hexagonal shape of hard component 20 depicts ridges at the plane of the intersection of two adjacent sides to convey a scraping capability of treat 10 with oral health benefits and also provides a solid base for mechanical joint 40. Hard component 20 can have any suitable shape compatible with soft component 30, e.g., the hard component can be cylindrical, triangular, rectangular, hexagonal, octagonal, and the like.

Soft component 30 can be wrapped around mechanical joint 40 of hard component 20 in a spiral shape. As a result, soft component 30 is mechanically attached to hard component 20 via mechanical joint 40. This mechanical attachment prevents soft component 30 from coming detached from hard component 20 during an extended period, e.g., 1 week, 2 weeks, 1 month, 6 months, 12 months or longer, including during storage of multi-textured animal treat 10.

As used herein, a "mechanical joint" is a protrusion extending from the hard component by which the soft component can readily surround and maintain an attachment to the hard component. Mechanical joint 40 can be provided along part of or the entire length of hard component 20. Mechanical joint 40 can also be provided intermittently along the length of hard component 20. Soft component 30 can be placed over and attached to any suitable portion of mechanical joint 40 so that at least a portion or all of soft component 30 (e.g., groove 32) is fixedly attached to hard component 20. In addition to the dovetail shape shown in FIG. 1, mechanical joint 40 can be in any suitable shape including a triangle, hook, t-shape, arrow, and the like suitable for fixedly attaching soft component 30 to hard component 20. It should be appreciated that this description of mechanical joint 40 can apply to any embodiments of the multi-textured animal treat described herein and to multiple mechanical joints when the multi-textured animal treat has multiple soft components.

In another aspect, along with mechanical joint 40, soft component 30 can be attached to hard component 20 by using an edible adhesive such as, for example, sodium caseinate and/or gelatine. The adhesion of soft component 30 to hard component 20 is enhanced by providing a large surface area via mechanical joint 40 at the interface of the components. The adhesive can be added to soft component 30 during manufacturing. Alternatively, the adhesive can be added to hard component 20 or both soft component 30 and hard component 20. During the stage when soft component 30 contains a substantial amount of moisture and is wrapped around hard component 20, the sodium caseinate/gelatine acts as an adhesive and causes soft component 30 to fixedly be attached to hard component 20 when the two components are extruded and dried. It should be appreciated that this description of mechanical joint 40 with adhesive can apply to any embodiments of the multi-textured animal treat described herein that use adhesives and to multiple mechanical joints when the multi-textured animal treat has multiple soft components.

In addition to or in place of sodium caseinate/gelatine, the adhesive can be from one or more maltodextrins, flours (e.g., pre-cooked/toasted flours), starches, animal proteins, vegetable proteins or combinations thereof. Suitable animal proteins include plasma and blood. Suitable vegetable proteins include pea protein, corn protein (e.g., ground corn or corn gluten), wheat protein (e.g., ground wheat or wheat gluten), soy protein (e.g., soybean meal, soy concentrate, or soy isolate), rice protein (e.g., ground rice or rice gluten) and the like. These vegetable proteins may be provided in the form of meals, flours, concentrates, and isolates as desired.

The adhesive can be used in any suitable amount to provide sufficient adhesion for the soft component to remain fixedly attached to the hard component. In an embodiment, the adhesive can be sodium caseinate ranging from about 0.1% to about 10% including about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5% and the like. In an embodiment, the adhesive can be gelatine (e.g., ≥100 Bloom) at ranging from about 1% to about 15% including about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5% and the like. It should be appreciated that this description of the adhesive(s) can apply to any embodiments of the multi-textured animal treat described herein.

In another aspect illustrated in FIG. 2, the invention provides a multi-textured animal treat 110 having a hard component 120 including a mechanical joint 140 and a soft component 130 fixedly attached to mechanical joint 140 with an adhesive. Hard component 120 has a hardness as measured by Instron compressibility values ranging from about 25 lb-f to about 60 lb-f (e.g., Instron 5500R) and more preferably from about 25 lb-f to about 55 lb-f or any value within the range. Soft component 130 has a hardness as measured by Instron compressibility values ranging from about 1 lb-f to about 20 lb-f (e.g., Instron 5500R) and more preferably from about 1 lb-f to about 15 lb-f or any value within the range. Multi-textured animal treat 110 can have any suitable length or thickness.

As further illustrated in FIG. 2, hard component 120 has a cylindrical shape (e.g., rope 121). Soft component 130 is wrapped around mechanical joint 140 of hard component 120 as a rope 131 in a spiral shape. As a result, soft component 130 (e.g., rope 132) is mechanically attached to hard component 140 via mechanical joint 140. This mechanical attachment prevents soft component 130 from coming detached from hard component 120 during an extended period, including during storage of multi-textured animal treat 110. In another aspect, along with the mechanical joint, soft component 130 can be attached to hard component 120 by using an adhesive.

In an alternative aspect illustrated in FIG. 3, the invention provides a multi-textured animal treat 210 having a hard component 220 and a soft component 230 fixedly attached to hard component 220 using a suitable adhesive. Hard component 220 has a hardness as measured by Instron compressibility values ranging from about 25 lb-f to about 60 lb-f (e.g., Instron 5500R) and more preferably from about 25 lb-f to about 55 lb-f or any value within the range. Soft component 230 has a hardness as measured by Instron compressibility values ranging from about 1 lb-f to about 20 lb-f (e.g., Instron 5500R) and more preferably from about 1 lb-f to about 15 lb-f or any value within the range. Multi-textured animal treat 210 can have any suitable length or thickness.

In this aspect, no mechanical joint is necessary. This adhesive attachment prevents soft component 230 from coming detached from hard component 220 for an extended period. As further illustrated in FIG. 3, hard component 220 has a twisted shape. Soft component 230 is wrapped around hard component 220 in a spiral shape. When the multi-textured animal treat has more than one soft component, the adhesive is used with all of the soft components or with some but not all of the soft components, as described herein.

The hard component can been formulated to provide sufficient resistance to a dog's biting of the multi-textured animal treat, which will induce a brushing effect on the dog's teeth surface. In any aspect of the multi-textured animal treats of the present disclosure, the hard component can be a starch-based extruded product. The hard component can also be a pregelatinized cereal grain such as, for example, corn, wheat, barley, millet, sorghum, oat, rye, triticale or a combination thereof.

In an embodiment, the hard component can be a bio-plastics material produced from an expanded material as described in U.S. Patent Publication No. 2006/0292288. The bio-plastics material may be produced by a method that includes thermally treating a pre-expanded (e.g., porous) dry constituent so as to melt it. Preferably, cooking the pre-expanded dry constituent takes place in the presence of a component capable forming hydrogen bonds. The component can be a substance other than water. The component preferably is capable of solvating the constituent. The component may be a polyhydric solvent. This may be liquid or solid under standard temperature and pressure conditions. Examples of suitable liquid solvents are ethylene glycol, glycerol and propylene glycol. Examples of suitable solid polyhydric solvents are sugars and sorbitol. Water may be present.

The cooking of the pre-expanded dry constituent can be carried out preferably at low water activity and under low moisture conditions. Prior to the cooking, the pre-expanded constituent and the hydrogen bond-forming component, when used, are preferably mixed together to form a substantially homogeneous mixture, which is then disposed in a cooking vessel. Preferably, the mixture includes from 10% to about 90% by weight of the constituent and more preferably from 40% to about 80% by weight. Preferably, the mixture includes from about 0% to about 50% water by weight. Further preferably, the mixture includes from about 1% to about 15% water by weight. Preferably, the mixture includes from about 0% to 80% by weight of the hydrogen bond-forming component. Further preferably, the mixture includes from about 4% to about 16% of the hydrogen bond-forming component by weight.

The mixture may further include from about 1% to 30% protein. The protein may be derived from a plant or animal source or both. It may be provided as a protein concentrate. Optional ingredients such as those conventionally selected for inclusion in food products may also be added to the mixture. Accordingly, the mixture may still further include at least one additional constituent such as, for example, gelatin, dicalcium phosphate, a nutrient mixture, a reactive sugar, an amino acid, high-amylose or amylopectin component (such as starch) and inert (or non-digestible) fillers.

The mixture may further include a preservative. Suitable examples include potassium sorbate, sorbic acid, methyl para-hydroxybenzoate, calcium propionate and propionic acid. As water activity decreases, the need (if any) for such preservatives diminishes accordingly. Thus, where no water is added, no preservative is strictly needed. The presence, in preferred embodiments, of a hydrogen bond-forming component in combination with the pre-expanded constituent contained in the mixture, while requiring the input of substantial amounts of energy in the cooking, nevertheless promotes controlled transformation of the constituent into a stable, coherent and digestible foodstuff body that can form a hard component that has a desired texture and unique properties by design.

Using pre-expanded particles provides an advantage over unexpanded particles because the pre-expanded particles are highly porous and have a higher number of micro-pores of a size greater than ten times the average molecular radius of the chosen hydrogen bond forming component, for example a polyhydric solvent. Consequently, the pre-expanded particles have a larger external surface area to volume ratio, compared to unexpanded particles. The external surface area includes all surfaces accessible to molecules of the solvent, including surfaces within the pores, micro-pores and intra-particular tunnels. The pre-expanded particles are found to have a much faster absorption rate for the polyhydric solvent, compared to unexpanded prior art particles. The pre-expanded particles also have a much faster adsorption of polyhydric solvents compared to prior art particles. The pre-expanded particles further have a much faster rate of solvation with a polyhydric solvent compared to prior art particles.

In addition to the hard component, the soft component can include a preservative. In addition, at least one of the hard component and the soft component can include additional ingredients such as, for example, drugs, nutrients, herbs, oral care ingredients, visible nutrition ingredients, colorants, flavorants, humectants, antioxidants, or a combination thereof.

The oral care ingredients can be any ingredient that improves oral health. Typical oral care ingredients include those that freshen breath, control tartar, combat gingivitis, combat periodontitis, and the like. The oral care ingredients can be in the multi-textured animal treat in an amount ranging from about 0.05% to about 2.5%. Suitable oral care ingredients include alfalfa nutrient concentrate (contains chlorophyll), sodium bicarbonate, phosphates (e.g., tricalcium phosphate, acid pyrophosphates, tetrasodium pyrophosphate, metaphosphates, orthophosphates), peppermint, cloves, parsley, ginger, and the like.

The visible nutrition ingredients can be in the form of pieces or specks on the surfaces and/or within the hard component or soft component. The visible nutrition ingredients can be in the multi-textured animal treat in an amount ranging from about 0.1% to about 0.8%. Suitable visible nutrition ingredients include corn germ meal, dehydrated vegetables, fruits, grains (e.g., spinach, carrots, cranberry), and the like.

The colorants can provide an aesthetic effect. The colorants can be in the multi-textured animal treat in an amount ranging from about 0.001% to about 0.8%. Suitable colorants include FD & C colors, natural colors, titanium dioxide, and the like. In various embodiments, the melt and the dough are different colors.

The flavorants can make the multi-textured animal treat more palatable for the animal. The flavorants can be in the multi-textured animal treat in an amount ranging from about 0.03% to about 8%, preferably from about 0.05 to about 5%, more preferably from about 0.1 to about 4%. Suitable flavorants include yeast, tallow, rendered animal meals (e.g., poultry, beef, lamb, and pork), flavor extracts or blends (e.g., grilled beef), and the like.

The humectants can provide an aesthetic effect. The humectants can be in the multi-textured animal treat in an amount ranging from about 9% to about 31%, preferably from about 11 to about 24%. Suitable humectants include salt, sugars, propylene glycol and polyhydric glycols such as glycerin and sorbitol, and the like.

The antioxidants can provide an aesthetic effect. The antioxidants can be in the multi textured animal treat in an amount ranging from about 0.01% to about 0.5%. Suitable antioxidants include BHA/BHT, vitamin E (tocopherols), and the like.

In general, any ingredient that is compatible with the hard component and/or soft component can be added to the component. For example, pharmaceuticals, nutraceuticals, drugs, herbs, nutrients, or other ingredients that prevent disease, treat disease, ameliorate disease symptoms, or affect one or more bodily functions can be added to one or more of the components where applicable, e.g., unsaturated fatty acids (UFA); nitric oxide releasing compounds (NORC); anti-glycation agents; colostrum; amino acids; proteins; peptides; polypeptides; nucleic acids; oligonucleotides; polynucleotides; small molecules; macromolecules; vitamins; minerals; simple sugars; complex sugars; polysaccharides; carbohydrates; medium-chain triglycerides (MCTs); triacylglycerides (TAGs); n-3 (omega-3) fatty acids such as DI-IA, EPA, and ALA; n-6 (omega-6) fatty acids such as LA, γ-linolenic acid (GLA) and ARA, SA, and conjugated linoleic acid (CLA); choline or choline sources such as lecithin; fat-soluble vitamins such as vitamin A and precursors thereof such as carotenoids (e.g., ((3-carotene); vitamin D sources such as vitamin D2 (ergocalciferol) and vitamin D3 (cholecalciferol); vitamin E sources such as tocopherols (e.g., α-tocopherol) and tocotrienols and vitamin E derivatives such as trolox; and vitamin K sources such as vitamin K1 (phylloquinone) and vitamin K2 (menadione); water-soluble vitamins such as B vitamins such as riboflavin; niacin (including nicotinamide and nicotinic acid); pyridoxine; pantothenic acid; folic acid; biotin; cobalamin; vitamin C (ascorbic acid); antioxidants including some of the vitamins listed above, especially vitamins E and C; bioflavonoids such as apigenin, catechin, flavonone, genistein, naringenin, quercetin and theaflavin; quinones such as ubiquinone; carotenoids such as lycopene and lycoxanthin; α-lipoic acid; L-carnitine; D-limonene; glucosamine; S-adenosylmethionine; chitosan; alginate; calcium; hyaluronic acid; magnesium; monooleylphosphatidic acid; nitric oxide (e.g., as nitroglycerin); S-carbamylcysteine; sodium butyrate; sodium salicylate; spermidine; sphingosine; and glucose. Other examples include ingredients that affect joint conditions or disease such as analgesics, glucosamine, chondroitin, non-steroidal anti-inflammatory drugs, chondroitin sulfate, and glucosamine sulfate. Other examples include immune system enhancing agents such as calcineurin inhibitors, glucocorticoids, and the like. Similarly, these and the above mentioned ingredients can be added to the hard component or soft component in various combinations when compatible with the components and each other, e.g., one or more oral care ingredients and one or more ingredients that affect joint conditions or disease in the same hard component or in the same soft component.

Similarly, the multi-textured animal treat can act as a delivery vehicle for numerous individual functional ingredients. For instance, one component may have a functional ingredient related to oral health while the other component may have an ingredient beneficial for joint health or gut health. In addition, by providing separate delivery vehicles via the hard and soft components, the multi-textured animal treat can carry ingredients that might adversely react with one another if they are in the same component.

In another aspect, the invention provides packages useful for containing a multi-textured animal treat of the invention. The packages comprise at least one material suitable for containing the multi-textured animal treat and a label affixed to the material containing a word or words, picture, design, acronym, slogan, phrase, or other device, or combination thereof, that indicates that the package contains the multi-textured animal treat. Typically, such device comprises the words "multi-textured animal treat" or "multi-textured animal treat having a hard and a soft component" or an equivalent expression printed on the material that distinguishes the multi-textured animal treat of the invention. Any package configuration and packaging material suitable for containing the multi-textured animal treat are useful in the invention, e.g., a bag, box, sachet, bottle, can, pouch, and the like manufactured from paper, plastic, foil, metal, and the like. In preferred embodiments, the package further comprises one or more multi-textured animal treats of the invention. In various embodiments, the package further comprises at least one window that permit the package contents to be viewed without opening the package. In some embodiments, the window is a transparent portion of the packaging material. In others, the window is a missing portion of the packaging material. The multi-textured animal treats have a hard component and a soft component fixedly attached to the hard component. The soft component remains fixedly attached to the hard component without separating for at least 8 weeks, 10 weeks, 12 weeks, 6 months, 12 months or longer.

In another aspect, the invention provides a method of making a multi-textured animal treat. The method comprises mixing a dry blend of components for a hard component with plasticizers in the extruder to form a first melt and mixing a dry blend of components for a soft component with plasticizers which are heated and mixed to form a dough. The first melt and the heated dough are coextruded through a die assembly to form the multi-textured animal treat. The first melt forms an elongated rope having at least one protrusion, preferably a protrusion on one side of the rope. The dough encases the protrusion and forms a mechanical joint prior to exiting the die assembly. The extruded hard component can have a twisted shape or a cylindrical shape. The soft component can be wrapped around the hard component in a spiral shape.

In an alternative aspect, the invention provides a method of making a multi-textured animal treat. The method comprises mixing a dry blend of components for a hard component with water in a first barrel of an extruder to form a first melt and mixing a dry blend of components for a soft component with water in a second barrel of an extruder to form a dough. At least one of the first melt and the dough can include an adhesive. The first melt and the dough are coextruded through a die assembly to form the multi-textured animal treat, the dough wrapped around the first melt prior to exiting the die assembly. The adhesive can be one or more maltodextrins, flours, starches, animal proteins, vegetable proteins and combinations thereof in an amount sufficient enough to fixedly attach the soft melt to the hard dough. In an alternative embodiment, the hard component can include a mechanical joint on which the soft component is fixedly attached to.

Generally, a hard component and one or more soft components are co-extruded and held together by mechanical or physical means as described herein.

In various embodiments, the invention provides multi-textured animal treats having a hard component (illustrated as 20 in FIG. 1) including two or more mechanical joints (one such mechanical joint illustrated as 40 in FIG. 1) and two or more soft components (one such soft component illustrated as 30 in FIG. 1) fixedly attached to a corresponding mechanical joint (illustrated as 40 in FIG. 1). In one embodiment, the hard component has two soft components fixedly attached to a corresponding mechanical joint on the hard component, i.e., the hard component has two mechanical joints and each of the soft components are attached to the hard component using a corresponding mechanical joint. In another, the hard component has three soft components fixedly attached to a corresponding mechanical joint, i.e., each soft component is attached to a different one of three mechanical joints on the hard component. In others, the hard component has four or more soft components fixedly attached to four or more corresponding mechanical joints on the hard component, the upper limit of soft components being dictated by the size of the hard component and the soft components.

The soft components can comprise the same ingredients or different ingredients, e.g., the ingredients given herein such as oral care ingredients, visible nutrition ingredients, colorants, flavorants, humectants, antioxidants, and combinations thereof. Similarly, the soft components can have the same or different size, shape, appearance, and texture. Varying these characteristics of the soft components permits the multi-textured animal treat to be customized as needed to meet the aesthetic, health, hedonistic, or other needs or various animals and, when applicable, their caregivers. For example, in certain embodiments the soft components contain different flavorants that vary the taste of the multi-textured animal treat; different ingredients that vary the texture of the multi-textured animal treat; and different colorants that vary the color of the multi-textured animal treat. In one embodiment, the multi-textured animal treat has two soft components, one containing one or more oral care ingredients and one containing one or more flavorants. This embodiment provides a flavorful treat that is desirable to the animal and that has a beneficial effect on oral health. In another, the multi-textured animal treat has two soft components, one containing one or more compounds that benefit joint health and one containing one or more different ingredients, e.g., flavorants, colorants, and the like. In another, the multi-textured animal treat has two soft components, one containing one or more flavorants and one containing one or more different flavorants. This embodiment provides a multi-flavorful treat that typically has enhanced appeal to the animal. In another, the multi-textured animal treat has two soft components, one containing one or more flavorants and one containing one or more antioxidants. This embodiment provides a flavorful treat that has a beneficial effect on animal health. In another, the multi-textured animal treat has two soft components, one containing one or more flavorants and one containing one or more medications. This embodiment provides a flavorful treat that the animal will desire and consume while taking needed medications without the difficulties that often accompany administering medications to animals. In a further, the multi-textured animal treat has three soft components, one containing flavorants and colorants; one containing oral health ingredients, and one containing antioxidants. Numerous such combinations can be prepared by the skilled artisan. Treats containing two or more soft components are made using the same methods described herein except that the two or more soft components are coextruded during the process. In certain other embodiments, the soft components have different sizes and/or shapes. Varying these characteristics of the soft components permits the multi-textured animal treat to be varied as needed to meet the aesthetic, manufacturing requirements, or other needs of manufacturers, animals and, when applicable, their caregivers. For example, when manufacturing a multi-textured animal treat with four soft components (often having different palatants, colorants, and the like), the soft components may need to have a smaller size so that the multiple soft components can be accommodated on the hard component while keeping the overall size of the multi-textured animal treat such that it is appealing to and/or can be consumed by the animal, e.g., mouth size and bite size compatible. Similarly, the shape of the soft components can be varied simply to create a visually appealing treat. For example, a multi-textured animal treat having three soft components can have one soft component in the shape of a star, one soft component in shape of a circle, and one soft component in shape of a triangle. Numerous combinations of shapes, sizes, flavorants, colorants, and the like are envisioned and are included within the invention.

In various embodiments, the multi-textured animal treat comprises a combination of soft components fixedly attached individually to the hard component using one or more mechanical joints and one or more edible adhesives, as the mechanical joints and adhesives are described herein.

In other embodiments, an individual soft component is fixedly attached to the hard component using a combination of one or more sections of mechanical joint and one or more sections of edible adhesive, e.g., one-half of an individual soft component is attached to the hard component using a mechanical joint and the other half of the soft component is attached to the hard component using edible adhesive or one-fourth of an individual soft component is attached to the hard component using a mechanical joint and one-third of the remaining soft component is attached to the hard component using edible adhesive. In some of these embodiments, there are one or more sections of the soft component that are not fixedly attached to the hard component.

In another aspect, the invention provided animal treats made according to the methods of the invention.

Various ingredients in various amounts can be used to make the multi-textured animal treats of the invention. Examples of such ingredients and ranges for such ingredients are:

| Hard Component Formulations | Preferred Ranges |
| --- | --- |
| Pregelatinized Rice Flour | Level varies with other components (66.6-89.1%) |
| Sorbic Acid | 0.2-0.4% |
| Glycerin | 6.0-27.0% |
| Water | 4.5-27.0% |

| Soft Component Formulations | Preferred Ranges |
| --- | --- |
| Wheat Gluten | 8.5-11.5% |
| Wheat Flour | 35-50% |
| Gelatin | 1-15% |
| Maltodextrin | 0.3-0.5% |
| Sodium Caseinate | 0.1-10% |
| Polyol (Glycerin/Hydrosorb) | 13-24% |
| Water | 0-7% |
| Sorbic Acid | 0.2-0.4% |
| Calcium Propionate | 0.15-0.3% |
| Phosphoric Acid | 0.2-0.4% |
| Total Product Formulations | |
| Cereal/Starch Matrix | |
| Pregelatinized Cereal Grain | Level varies with other components (44.4-59.4%) |
| Wheat Gluten | 2.2-3.8% |
| Wheat Flour | 10.1-16.7% |
| Binders/Glues/Adhesives | |
| Gelatin | 0.3-5% |
| Maltodextrin | 0.01-0.5% |
| Sodium Caseinate | 0.05-3.3% |
| Plasticizers-Humectants | |
| Polyols | 7.0-26% |
| Sugar/Salt | 2-5% |
| Water | 2.3-18% |
| Antimycotic Preservatives | |
| Sorbic Acid | 0.2-0.4% |
| Calcium Propionate | 0.05-0.1% |
| Phosphoric Acid | 0.07-0.14% |

In a further aspect, the invention provides kits. The kits comprise in separate containers in a single package or in separate containers in a virtual package, as appropriate for the kit component, at least one multi-textured animal treat of the invention and one or more of (1) one or more comestible ingredients, e.g. different treats, dog foods, cat foods, animal toys, and the like; (2) one or more devices useful for entertaining an animal, e.g., a play toy, a chew toy, and the like; (3) one or more devices useful for managing or protecting an animal, e.g., a piece of clothing, a leash, a collar, and the like; and (4) instructions for how to use the animal treats and other kit components, particularly for the benefit of the animal.

When the kit comprises a virtual package, the kit is limited to instructions in a virtual environment in combination with one or more physical kit components. The kits may contain the kit components in any of various combinations. In one embodiment, the kit contains a multi-textured animal treat of the invention and a container of food for consumption by an animal, e.g., dog food or cat food. In another, the kit contains the animal treat and an inedible chew toy. In another, the kit contains the animal treat and an animal collar and a corresponding leash. Numerous such combinations are within the purview of the skilled artisan.

In another aspect, the invention provides a package useful for containing a multi-textured animal treat of the invention. The package comprises at least one material suitable for containing the animal treat and a label affixed to the material containing a word or words, picture, design, acronym, slogan, phrase, or other device, or combination thereof, that indicates that the package contains the animal treat. Typically, such device comprises the words "multi-textured animal treat" or "long lasting multi-textured animal treat" or an equivalent expression printed on the material. Any package configuration and packaging material suitable for containing the animal treat are useful in the invention, e.g., a bag, box, bottle, can, pouch, and the like manufactured from paper, plastic, foil, metal, and the like. In preferred embodiments, the package further comprises an animal treat of the invention. In various embodiments, the package further comprises at least one window that permit the package contents to be viewed without opening the package. In some embodiments, the window is a transparent portion of the packaging material. In others, the window is a missing portion of the packaging material.

In another aspect, the invention provides a means for communicating information about or instructions for one or more of (1) instruction for using multi-textured animal treats of the invention, particularly to entertain or benefit an animal, and (2) using the kits of the present invention. The means comprises a document, digital storage media, optical storage media, audio presentation, or visual display containing the information or instructions. In certain embodiments, the communication means is a displayed web site, visual display, kiosk, brochure, product label, package insert, advertisement, handout, public announcement, audiotape, videotape, DVD, CD-ROM, computer readable chip, computer readable card, computer readable disk, computer memory, or combination thereof containing such information or instructions. Useful information includes contact information for animals or their caregivers to use if they have a question about the multi-textured animal treats of the kits.

EXAMPLES

By way of example and not limitation, the following examples are illustrative of various embodiments of the present disclosure. The examples describe formulations for the hard and soft components and the method of linking them to form a multi-textured twisted product that stays together through the product shelf life.

Example 1

Hard Component

One thousand (1000) pounds (lbs) of extrudate for the hard component was prepared by weighing each ingredient as shown in Table 1 and adding to a ribbon mixer where they were mixed to form a homogeneous dry blend.

The dry blend was then transferred to a hopper that feeds a twin screw extruder ("TSE"). The screws were configured for high shear and a vent section was used towards the exit end of the extruder barrel.

After extruder start-up, the dry blend was fed into the first barrel of the extruder at 8 lbs/minute. Glycerin that was heated to 160° F. (320° C.) was injected into this barrel at 16% of the dry blend feed rate. Water was also injected into this section at 15.5% dry blend feed rate. The screw speed was adjusted to develop a pressure that ranged from 1200-1600 psi and temperature ranging from 198-220° F. (428° C.) in the dough melt. This melt was then pumped through the vent section and into a hexagonal die in a die assembly attached at the end of the extruder creating a rope.

TABLE 1

Hard Component Formulation

| Ingredient | Lbs |
| --- | --- |
| Pregelatinized Rice Flour | 908.5 |
| Distilled Monoglyceride | 17.5 |
| BHA/BHT Powder Oxy-Block 14 | 0.25 |
| Yeast Internal Dried | 30.75 |
| Corn Germ Meal | 12.0 |
| Poultry By-Product Meal | 10.2 |
| Tricalcium Phosphate (High Density) | 11.0 |
| Sodium Bicarbonate | 0.3 |
| Sorbic Acid | 3.0 |
| Color Blend | 6.5 |
| Total | 1000.0 |

Example 2

Soft Component

Two hundred ninety-three lbs of dry blend for the soft component was made by weighing ingredients as shown in Table 2 into a double ribbon mixer with steam injection ports. The ingredients were mixed into a homogeneous dry blend. To this blend, liquids and flavors were weighed as shown in Table 3 and added while continuously mixing and with steam injection until the product reached a temperature ranging from 185-190° F. (365-374° C.) forming a 400 lb batch. The hot dough was emptied into the hopper of a high pressure (e.g., up to 1000 psi) screw pump. The dough was then pumped to a die adjacent to the die for the hard component in the same die assembly attached to the end of the TSE. For this soft component, a round die was used to create a rope. The flow rate of the soft extrudate was adjusted to 33% of that of the hard extrudate.

TABLE 2

Dry Mix Blend for Soft Component

| Ingredient | lbs |
| --- | --- |
| Titanium Dioxide | 3.82 |
| Maltodextrin DE 10 | 0.38 |
| Wheat Gluten Vital Bulk | 38.2 |
| Sodium Caseinate | 12.98 |
| Wheat Flour Second Clear or Better | 168.0 |
| Sugar Granulated | 27.5 |
| Gelatin 250 Bloom | 16.4 |
| Sorbic Acid | 1.38 |
| Calcium Propionate | 0.96 |
| Deoiled Dried Soy Lecithin | 0.38 |
| Ground Alfalfa Nutrient Concentrate | 15.3 |
| Salt | 7.7 |
| Total | 293.0 |

TABLE 3

Soft Component Formulation

| Ingredient | lbs |
| --- | --- |
| Dry Mix Blend | 293 |
| Glycerin | 62.6 |
| Roquette Hydrosorb AN 7522 | 12.8 |
| Water | 13.9 |
| Tallow Edible w/Vitamin E | 12.7 |
| Phosphoric Acid | 4 |
| Grilled Beef Flavor (Givaudan) | 1 |
| Total | 400.0 |

Example 3

Forming the Multi-textured Twist Product—1

As shown in Example 1 (the hard extrudate) and Example 2 (the soft extrudate) were both formed separately in the same die assembly. Further, as the hard extrudate entered the die, one of the vertices was compressed to create a protrusion (e.g., this could be dovetail or tongue, or any other shape as square, rectangular, circular, and polygonal) and at this point the hard and soft extrudates were still separated from each other. At approximately one third of the length of the die assembly, the flow paths were configured so that the extruded ropes were brought in contact and the protrusion of the hard extrudate penetrated into the soft extrudate. From that point the die cross-section area was maintained to ensure that mechanical compression was applied to both ropes through the discharge of the die assembly to strengthen the bond that was created. The bonded ropes were rotated as they exited the die assembly creating a braided structure. This product was cut in approximately six inch pieces and sealed in moisture barrier flexible bags. The product is shown in FIG. 1. The products were stored at ambient conditions and examined every two weeks. After 12 months, the ropes were still strongly bonded and the dual texture was maintained.

Example 4

Forming the Multi-textured Twist Product—2 (Adhesive Only)

As shown in Example 1 and Example 2, the hard extrudate and the soft extrudate were formed separately and fed to the die assembly where they were brought together without the protrusion (i.e., mechanical joint) and rotated as they exited the die assembly forming an intertwined braided structure. The product was cut in approximately six inch pieces and sealed in moisture barrier flexible bags. The products were stored at ambient conditions and examined every two weeks. After about 8 weeks of storage, the ropes started to separate.

Example 5

Forming the Multi-textured Twist Product—3 (No Adhesive or Mechanical Joint)

Example 4 was repeated but the sodium caseinate in the soft component was removed. In less than two weeks the ropes of storage, the ropes separated.

Example 6

Forming the Multi-textured Twist Product—4 (Mechanical Joint Only)

Example 3 was repeated but the sodium caseinate in the soft component was removed. After about 8 weeks of storage, the ropes started to separate.

Example 7

Forming the Multi-textured Twist Product—5

Example 3 was repeated but the mechanical joint was created after the steam flashing and loss of stickiness (glue functionality)—about 6 inches from the die exit. The ropes separated immediately showing that adhesive property of the composition is needed for the formation of the bond between the multi-textured ropes.

Example 8

Forming the Multi-textured Twist Product—6

Examples 1, 2, & 3 were repeated where the sodium caseinate in the soft component was removed and included in the hard component at 1.4% in the hard component formula and the rice flour reduced proportionately. After 12 months, the ropes were still strongly bonded and the dual texture was maintained. This example shows that the added adhesive component is effective in either the soft component or the hard component.

Example 9

Hardness and Softness Tests

The follow texture studies for samples took place at ambient 70-75° F. (158-167° C.). An Instron® 5500R fitted with a pointed brass cone was used. A hard component (in the form of a rope) was placed on a solid platform and the Instron crosshead with the pointed cone probe was activated to travel towards the hard rope at 2 inches per minute. The maximum load when the probe penetrated 0.4 inch into the rope was taken as a measure of hardness/softness. Measurements were taken at 3 different points, an inch apart, on a rope and on three different ropes. The values ranged from about 31 pound force ("lb-f") to about 45 lb-f. This experiment was repeated for the soft component (in the form of a rope) and the values ranged from about 10 lb-f to about 13 lb-f. Reasonable expected values for embodiments of the hard component range from about 25 lb-f to about 60 lb-f, and the soft component from about 1 lb-f to about 20 lb-f.

All patents, patent applications, publications, and other references cited or referred to herein are incorporated herein by reference to the extent allowed by law. The discussion of those references is intended merely to summarize the assertions made therein. No admission is made that any such patents, patent applications, publications or references, or any portion thereof, are relevant prior art for the present invention and the right to challenge the accuracy and pertinence of such patents, patent applications, publications, and other references is specifically reserved.

The invention is claimed as follows:

1. A method of making a multi-textured animal treat, the method comprising:
   mixing a dry blend of components for a hard component with plasticizers in an extruder to form a first melt;
   mixing a dry blend of components for a soft component with plasticizers to form a soft component blend;
   mixing and heating the blend for the soft component to form a dough;
   coextruding the first melt and the dough through a die assembly to form the multi-textured animal treat, the first melt forming an elongated rope having at least one protrusion, the dough encasing the at least one protrusion while in the die assembly to form a mechanical joint, the soft component comprises sodium caseinate and surrounds the at least one protrusion to form a mechanical joint that fixedly attaches the soft component to the hard component, wherein the coextruding is performed such that the soft component is wrapped around sides of the rope in a spiral shape that encircles the hard component, wherein the sides of the rope are partially visible through the spiral shape, and the hard component is further fixedly attached to the at least one soft component by the sodium caseinate.

2. The method of claim 1 wherein the hard component in the multi-textured animal treat has a twisted shape.

3. The method of claim 1 wherein the dry blend of components for the hard component comprises pregelatinized cereal grain.

4. The method of claim 1 wherein the plasticizers for the hard component comprise a polyol.

5. The method of claim 1 wherein the dry blend of components for the soft component comprises flour and the sodium caseinate.

6. The method of claim 5 wherein the plasticizers for the soft component comprise a polyol.

7. The method of claim 1 wherein the hard component in the multi-textured animal treat exhibits a hardness as measured by Instron compressibility values ranging from about 25 lb-f to about 60 lb-f; and the soft component in the multi-textured animal treat exhibits a hardness as measured by Instron compressibility values ranging from about 1 lb-f to about 20 lb-f.

8. The method of claim 1, wherein the hard component comprises pregelatinized cereal grain, 6.0-27.0 wt. % polyol and 4.5-27.0 wt. % water; and the soft component comprises 35-50 wt. % flour, 0.1-10% sodium caseinate and 13-24% polyol.

9. The method of claim 8, wherein the hard component exhibits a hardness as measured by Instron compressibility values ranging from about 25 lb-f to about 60 lb-f; and the soft component exhibits a hardness as measured by Instron compressibility values ranging from about 1 lb-f to about 20 lb-f.

10. The method of claim 9, wherein the soft component remains fixedly attached to the hard component, without separating, for at least twelve months during storage of the multi-textured animal treat.

11. A method of making a multi-textured animal treat, the method comprising:
   mixing a dry blend of components for a hard component with water in a first barrel of an extruder to form a first melt;
   mixing a dry blend of components for a soft component with water in a second barrel of an extruder to form a dough, at least one of the first melt and the dough including an adhesive; and
   coextruding the first melt and the dough through a die assembly to form the multi textured animal treat, the dough wrapped around the first melt prior to exiting the die assembly, the first melt forming an elongated rope having at least one protrusion, the dough encasing the at least one protrusion while in the die assembly to form a mechanical joint, the soft component comprises sodium caseinate and surrounds the at least one protrusion to form a mechanical joint that fixedly attaches the soft component to the hard component, wherein the coextruding is performed such that the soft component is wrapped around sides of the rope in a spiral shape that encircles the hard component, wherein the sides of the rope are partially visible through the spiral shape, and the hard component is further fixedly attached to the at least one soft component by the sodium caseinate.

12. The method of claim 11 wherein the hard component has a twisted shape.

13. The method of claim 11 wherein the dry blend of components for the hard component comprises pregelatinized cereal grain.

14. The method of claim 13 wherein the hard component further comprises a polyol.

15. The method of claim 11 wherein the dry blend of components for the soft component comprises flour and the sodium caseinate.

16. The method of claim 15 wherein the soft component further comprises a polyol.

17. The method of claim 11 wherein the hard component in the multi-textured animal treat exhibits a hardness as measured by Instron compressibility values ranging from about 25 lb-f to about 60 lb-f; and the soft component in the multi-textured animal treat exhibits a hardness as measured by Instron compressibility values ranging from about 1 lb-f to about 20 lb-f.

18. The method of claim 11, wherein the hard component comprises pregelatinized cereal grain, 6.0-27.0 wt. % polyol and 4.5-27.0 wt. % water; and the soft component comprises 35-50 wt. % flour, 0.1-10% sodium caseinate and 13-24% polyol.

19. The method of claim 18, wherein the hard component exhibits a hardness as measured by Instron compressibility values ranging from about 25 lb-f to about 60 lb-f; and the soft component exhibits a hardness as measured by Instron compressibility values ranging from about 1 lb-f to about 20 lb-f.

20. The method of claim 19, wherein the soft component remains fixedly attached to the hard component, without separating, for at least twelve months during storage of the multi-textured animal treat.

* * * * *